March 15, 1949.  R. R. GRIFFIN ET AL  2,464,307
EGG HOLDER
Filed Dec. 4, 1945
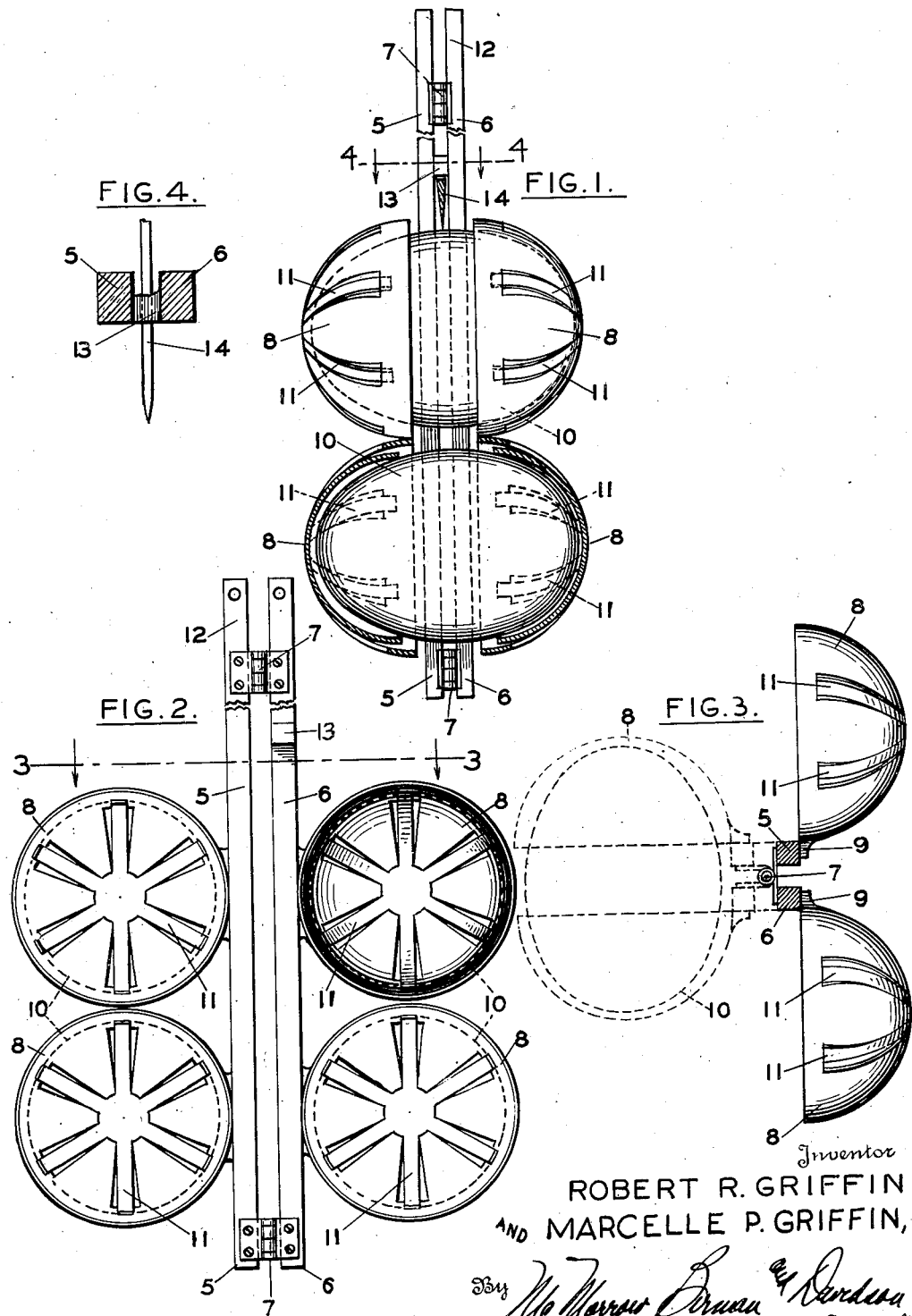
Inventor
ROBERT R. GRIFFIN
AND MARCELLE P. GRIFFIN, Patented Mar. 15, 1949

2,464,307

UNITED STATES PATENT OFFICE 2,464,307

EGG HOLDER

Robert R. Griffin and Marcelle P. Griffin,
Griffin, Ga.

Application December 4, 1945, Serial No. 632,766

2 Claims. (Cl. 99—440)

The present invention relates to new and useful improvements in egg holders, and the primary object is to provide a device of this character by means of which a plurality of eggs may be inserted and supported within a boiler and removed therefrom when cooked.

A further object of the invention is to provide an egg holder embodying a pair of hingedly connected cup-like sections adapted for receiving the eggs and to hold the same while immersed in a boiler for cooking the eggs and also providing means whereby a knife blade may be moved between the adjacent ends of the sections of the holder to cut the eggs in half while the eggs are retained in position in the holder.

Another important object of the invention is to provide resilient clips in the cup-like sections of the holders for securing an end of the egg in position therein.

A still further object is to provide a device of this character of simple and practical construction, which is efficient in use, relatively inexpensive to manufacture, and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a view in elevation with parts broken away and shown in section.

Figure 2 is a similar view showing the cup-like sections of the holder in open position.

Figure 3 is a transverse sectional view taken substantially along the line 3—3 of Figure 2.

Figure 4 is an enlarged transverse sectional view taken on a line 4—4 of Figure 1.

Referring now to the drawing in detail, wherein for the purpose of illustration we have disclosed a preferred embodiment of this invention, the numerals 5 and 6 designate a pair of strips of wood or other suitable material of substantially rectangular shape in cross-section and hingedly connected to each other adjacent each end by conventional hinge members 7, the hinges normally connecting the strips 5 and 6 in spaced parallel relation when the strips are swung into either an open or closed position.

A plurality of cup-like members 8 are secured at one edge to an edge of each of the strips by means of a web structure 9 and project laterally outwardly from the outer side edges of the strips, the members 8 being arranged in pairs to cooperate in forming an ovoid-shaped container when the strips 5 and 6 are swung to move the open edges of the members 8 toward each other into a position as shown in Figure 1 of the drawing for holding an egg 10 therein.

Each of the cup-like members 8 is provided with a plurality of inwardly struck fingers 11 of resilient material arranged to provide spring clips in each of the members 8 for gripping an end of the egg.

One end of the strips 5 and 6 project beyond the adjacent cup members 8, as shown at 12, to provide a handle for the holder and to facilitate the swinging of the strips relative to each other on the hinges to open and close the cups.

To one of the strips is secured a block 13 to function as a stop against which the other of said strips abuts when the strips are moved to close the cups whereby to maintain the strips in spaced-apart relation for moving a knife blade 14 therebetween as well as between the opposed open edges of the cups to sever the egg therein.

From the foregoing it is believed the manner of use and operation of the device will be apparent. In order to place the eggs in position in the cups, the cups are first moved into an open position, as shown by the full lines in Figure 3 of the drawing, and one end of the egg is placed in position for gripping by the spring clips 11. The cups are then moved into their closed position, as shown by the dotted lines in Figure 3, whereby both ends of the eggs are firmly held by the spring clips in the cups, and the device may then be placed in a boiler or other cooking vessel for immersing the eggs therein for cooking the eggs.

The eggs may then be severed by moving the knife blade 14 between the strips 5 and 6 without necessitating removal of the eggs from the cups, and the severed halves of the eggs will be held in the opposed cups after the cups are moved into their open position.

It is believed that the details of construction, manner of use and advantages of the device will be readily understood from the foregoing without further detailed explanation.

It is to be understood, however, that even though we have herein shown and described a preferred embodiment of our invention, the same is susceptible of certain changes fully comprehended by the spirit of the invention as herein described, and the scope of the appended claims.

What we claim is:

1. As a new article of manufacture, an egg-holding device adapted for immersion in a vessel of boiling water comprising in combination, a pair of elongated substantially vertically-extending strips of substantially the same size and form, hinges connecting said strips adjacent their upper and lower ends, said hinges being adapted to permit swinging of said strips between a relatively co-planar position and a relatively parallel position, and a cup-like member secured to each of said strips in the same horizontal plane with one another, said cup-like members being provided with a plurality of cut-out portions struck inwardly to form a plurality of egg-gripping prongs and openings for allowing both the admission and exit of boiling water to and from the device.

2. As a new article of manufacture, an egg-holding device adapted for immersion in a vessel of boiling water comprising in combination, a pair of elongated strips of substantially the same size and form, hinges connecting said strips adjacent their upper and lower ends, said hinges being adapted to permit swinging of said strips between a relatively co-planar open position and a relatively parallel closing position, a block secured to one of said strips adjacent its upper end to limit the amount of the swinging thereof into their said closing position, and a cup member secured to each of said strips in the same horizontal plane with one another, said cup-like members being provided with a plurality of cut-out portions struck inwardly to form a plurality of egg-gripping prongs and openings for allowing both the admission and exit of boiling water to and from the device.

ROBERT R. GRIFFIN.
MARCELLE P. GRIFFIN.

REFERENCES CITED

The following references are of record in the file of this patent:

UNITED STATES PATENTS

| Number | Name | Date |
|---|---|---|
| 1,234,407 | Stiga | July 24, 1917 |
| 1,335,306 | Urso | Mar. 30, 1920 |
| 1,433,824 | Jensen | Oct. 31, 1922 |
| 2,314,872 | Dickey | Mar. 30, 1943 |

FOREIGN PATENTS

| Number | Country | Date |
|---|---|---|
| 8,793 | Great Britain | 1904 |
| 27,651 | Great Britain | 1902 |
| 315,419 | Germany | Oct. 27, 1919 |